United States Patent [19]

Davis et al.

[11] Patent Number: 5,269,561
[45] Date of Patent: Dec. 14, 1993

[54] VENTED GAS PASSENGER SIDE AIR BAG INFLATOR

[75] Inventors: Terry R. Davis, Fruit Heights; Donald J. Bolieau, North Ogden, both of Utah

[73] Assignee: Morton International, Inc., Chicago, Ill.

[21] Appl. No.: 909,518

[22] Filed: Jul. 6, 1992

[51] Int. Cl.$^5$ .................................. B60R 21/26
[52] U.S. Cl. ..................... 280/736; 280/742; 422/166
[58] Field of Search ............. 102/530, 531; 422/164, 422/165, 166; 280/736, 741, 742, 728, 738, 739

[56] References Cited

U.S. PATENT DOCUMENTS

| | | | |
|---|---|---|---|
| 3,880,447 | 4/1975 | Thorn et al. | 280/740 |
| 4,380,346 | 4/1983 | Davis et al. | 422/166 |
| 4,846,368 | 7/1989 | Goetz | 280/736 |
| 4,886,293 | 12/1989 | Weiler et al. | 280/736 |
| 4,950,458 | 8/1990 | Cunningham | 422/166 |

FOREIGN PATENT DOCUMENTS 2022194  12/1974  United Kingdom ............... 280/742

Primary Examiner—Karin L. Tyson
Attorney, Agent, or Firm—Gerald K. White

[57] ABSTRACT

An air bag inflator having a plurality of gas exit orifices of three different sizes arranged so as to provide thrust neutral operation maintains air bag performance at the same level over the temperature range of ambient to +85° C., directing all of the generated gases into the air bag at ambient temperature, but allowing a portion of the gases to be directed away from the air bag at +85° C.

3 Claims, 4 Drawing Sheets

PRIOR ART

VENTED GAS PASSENGER SIDE AIR BAG INFLATOR

BACKGROUND OF THE INVENTION

1. Field of the Invention

This invention relates to an improvement in a solid fuel inflator for an air bag or cushion restraint system that is provided on the passenger side of an automotive vehicle and is characterized by providing "leveled performance" throughout the range of ambient temperatures over which the inflator is intended to be operative while maintaining a "thrust neutral" configuration. The invention is further characterized in allowing the use of a "wrap-around" bag construction.

2. Description of the Prior Art

Some terminology herein is used for convenience in reference only and is not intended to be limiting. The words "forwardly" and "rearwardly" refer to the normal forward and reverse directions of travel of the vehicle to which a passenger restraint module is attached.

By the term "leveled performance" is meant equivalent occupant restraint over the ambient temperature range $-30°$ C. to $+85°$ C.

By the term "bell mouthing" is meant deformation of the module housing or reaction canister tending to be caused by the rapid lateral expansion of the air bag before it has escaped the confines of the module housing or reaction canister in which it has been stored.

The term "thrust neutral" refers to the production by an inflator for an air bag of zero thrust when accidentally initiated as, for example, during shipping, storage and handling, as well as during activation responsively to the onset of a collision. Specifically, the gas discharge orifices of the inflator are so positioned around the periphery of the inflator that the gas is discharged in opposing directions whereby there are no resulting forces tending to cause movement thereof. Thus, the inflator will expend the energy generated thereby generally in place.

It is known in the prior art to provide an inflatable restraint system including an air bag which is expanded by a solid fuel inflator to restrain movement of an occupant of an automotive vehicle in the event of a collision. The inflator is designed to rapidly generate a quantity of gas sufficient to inflate the bag. It has been found, however, that in very cold weather the inflator attains its peak pressure much less rapidly than in warm weather. Thus, in cold weather, there is a tendency for the air bag to be inflated either too slowly or insufficiently to perform its intended purpose. Inflator performance such as this which varies with ambient temperature can cause discomfort or possible injury to the vehicle occupant who relies upon inflation of the air bag for protection.

U.S. Pat. No. 4,380,346, L. E. Davis et al., assigned to the assignee of the present invention, discloses an elongated cylindrical air bag inflator for the passenger side of an automotive vehicle and characterized in providing uniform operation in both cold and warm weather in a thrust neutral configuration. In this arrangement the orifices or passages in the inflator housing are all of uniform size and a multiple strength rupturable foil is provided in association therewith to allow selected ones of the orifices to open at a low pressure, and other orifices to open at a higher pressure.

While the Davis et al. arrangement is thrust neutral, it is subject to a disadvantage in that all of the generated gases flow rearwardly into the air bag. The increased deployment forces on the stored air bag and module housing at the higher temperatures tend to cause deformation, that is, bell mouthing of the module housing and to tear the air bag upon deployment thereof.

U.S. Pat. No. 4,817,828, G. W. Goetz, discloses an inflatable restraint system for the passenger side of an automotive vehicle including an elongated cylindrical inflator. Provided on one side of the housing for the inflator are a plurality of orifices or passages of a first size which are arranged to direct generated gases rearwardly into an air bag. A plurality of orifices of a second and smaller size is provided on the opposite side of the housing for directing gas forwardly away from the bag into the vehicle compartment or into a conduit leading to the surrounding environment. A foil on the inside wall of the inflator housing ruptures adjacent the larger orifices of the first size at a pressure that is lower than the pressure at which the foil ruptures at the smaller orifices of the second size. The first and second pluralities of orifices are blocked by the foil prior to activation of the inflator. Upon activation of the inflator, the foil adjacent the plurality of orifices of the first size ruptures when a sufficient pressure builds up in the inflator to allow generated gases to flow into the air bag. Thus, the air bag is not subjected to relatively low pressure which would tend to cause the air bag to be inflated slowly in cold weather. If the pressure in the inflator is too high, which tends to occur when the ambient temperature is high, the second and smaller size orifices open when the foil seal covering them is ruptured to direct gas away from the air bag. As a result, the air bag is not subjected to excessive pressure because of high ambient temperatures.

Although the Goetz patent provides for directing generated gases away from the air bag when the temperature is high, it is subject to a disadvantage in that it does not provide for a thrust neutral configuration. In the absence of a thrust neutral configuration, the thrust produced by the deployment forces must be absorbed by the module housing in which the stored air bag and inflator are contained and also by the dashboard of the automotive vehicle in which the occupant restraint system is installed. Such thrust tends to cause damage not only to the module housing but also to the dashboard of the vehicle. Additionally, the arrangement of the Goetz patent does not allow the inflator to be cooperatively positioned with respect to the air bag in a wrap-around configuration.

Also known in the prior art is an elongated cylindrical solid fuel thrust neutral inflator assembly, as schematically illustrated in FIGS. 1 and 2 of the drawings, the internal construction of which is generally similar to that of the aforementioned Davis et al. patent. The inflator assembly there shown, designated by the reference numeral 10, includes first, second and third pluralities of orifices 12, 14 and 16, respectively, from which, upon activation of the inflator 10, generated gases flow under pressure and are directed rearwardly into an air bag (not shown). The cross sections of the first, second and third pluralities of orifices are all of different size.

Prior to activation of the inflator 10, a rupturable foil 18 on the inside of the housing 20 therefor, as seen in FIG. 2, blocks all of the orifices. The first plurality of orifices 12, those having the largest area, are opened to allow gas to flow into the air bag when a sufficient pressure builds up in the inflator 10 to rupture the portions of the 18 adjacent thereto. Thus, the air bag is not subjected to a relatively low pressure that could cause the air bag to be slowly or otherwise improperly inflated under cold weather conditions.

If the pressure internally of the inflator continues to rise, as tends to occur upon an increase in the ambient temperature, the second plurality of orifices 14, those having an area of intermediate size, open to direct gas into the air bag as the result of rupture of the portions of the foil 18 adjacent thereto. This relieves the inflator internal pressure and thus avoids subjecting the air bag to an abnormally high deployment force. Similarly, if the ambient temperature continues to rise to +85° C., the orifices 16 having the smallest area also open when the pressure in the inflator rises sufficiently to rupture the portions of foil 18 adjacent those orifices. Opening of the orifices 16 also causes generated gas to be directed into the air bag and the internal pressure within the inflator 10 to be additionally relieved. This tends to avoid subjecting the air bag to excessive pressures because of the high ambient temperature.

The first, second and third pluralities of orifices 12, 14 and 16 open at different internal pressures of the inflator 10. The foil portions 18 covering the largest of the orifices ruptures first because those orifices have the largest area exposed to the inflator pressure. The portions of foil 18 covering the orifices having the largest area rupture at a pressure lower than the foil portions adjacent the orifices 14 of intermediate area. Similarly, the foil portions covering the orifices 14 of intermediate area rupture at a lower pressure than the portions of foil 18 adjacent the orifices 16 having the smallest area.

The inflator assembly 10 disclosed in FIGS. 1 and 2, similarly to that disclosed in the Davis patent, is subject to a disadvantage in that all of the solid fuel generated gases over the entire range of operation flow rearwardly into the air bag. The resulting increased deployment forces on the air bag and on the module (not shown) employed to house the inflator at the higher temperatures, particularly, tend to cause bell mouthing of the module housing and to tear the air bag during deployment.

Thus, there is a need and a demand for an improved solid fuel inflator for air bag restraint systems having utility on the passenger side of automotive vehicles to the end of providing leveled performance throughout the range of ambient temperatures over which the inflator is intended to be operative while maintaining a thrust neutral configuration, and further, which is characterized in allowing the use of a wrap-around air bag configuration. The present invention was devised to fill the gap that has existed in the art in these respects.

SUMMARY OF THE INVENTION

An object of the invention is to provide an improved solid fuel inflator assembly for air bag restraint systems used on the passenger side of automotive vehicles.

Another object of the invention is to provide such an inflator assembly that is operative to provide leveled performance throughout an ambient temperature range of −30° C. to +85° C. while maintaining a thrust neutral configuration.

A further object of the invention is to provide an inflator that is operative at an ambient temperature of +85° C. to direct gases away from the air bag, thereby helping to:

1. dissipate the increased deployment forces on the air bag and module housing, minimizing the tendency to bell mouthing at the module housing and avoiding tearing of the air bag upon deployment;
2. increase the filtering of deployment gases exterior to the inflator; and
3. provide equivalent occupant restraint over the ambient temperature range from −30° C. to +85° C.

Another object of the invention is to provide an inflator for inflating a vehicle occupant restraint comprising, an elongated housing, said housing having a first plurality of orifices and a second plurality of orifices for directing gas generated by said inflator into the restraint and a third plurality of orifices for directing gas generated by said inflator away from the restraint;

means covering said first plurality of orifices, said second plurality of orifices and said third plurality of orifices which ruptures at a first predetermined pressure to allow gas to flow into the restraint through said first plurality of orifices, which ruptures at a second predetermined pressure higher than said first predetermined pressure to allow gas to flow into the restraint through said second plurality of orifices, and which ruptures at a third predetermined pressure higher than said first and second predetermined pressures to allow gas to flow away from the restraint through said third plurality of orifices;

with the orifices of the first, second and third plurality of orifices being so positioned with respect to said housing as to provide a thrust neutral configuration.

Still another object of the invention is to provide such an inflator assembly that allows the use of a wrap-around air bag configuration.

In accomplishing these and other objectives of the invention, there is provided an elongated cylindrical solid fuel inflator assembly having a thrust neutral configuration for air bag restraint systems used on the passenger side of automotive vehicles. Provided on opposed wall portions of a housing for the inflator and displaced substantially 180° from each other are gas discharge orifices of first and second pluralities of orifices, with each of the first and the second plurality of orifices positioned in a plane individual thereto, which planes are disposed at an angle to one another and intersect coincidentally with the longitudinal axis of the inflator. The orifices of the first plurality of orifices have a larger area than the orifices of the second plurality of orifices. The orifices of both of the first and second pluralities of orifices are spaced generally uniformly along a first portion of the length of the inflator with the orifices of the first and second pluralities of orifices being offset from one another. Rupturable foil on the inner side of the wall of the housing for the inflator normally blocks all of the orifices of the first and second pluralities of orifices.

Further, in accord with the invention, a third plurality of gas discharge orifices are provided in two rows in a second portion of the inflator located adjacent to an end thereof in parallel planes substantially perpendicular to the longitudinal axis of the housing for the inflator assembly. The orifices of the third plurality of orifices are all of the same size, having an area that is intermediate in size those of said first and second pluralities of orifices and extend completely around the periphery of the inflator in uniformly side-by-side spaced relation. Rupturable foil on the inner wall of the housing for the inflator normally blocks all of the third plurality of orifices.

Prior to activation of the inflator, all three pluralities of first, second and third orifices are blocked. Upon activation of the inflator, the first plurality of orifices open, when a sufficient pressure builds up in the inflator, to direct a flow of inflating gas into the air bag for the proper inflation thereof, even in extremely cold weather. When the ambient temperature is in a range intermediate extreme cold, −30° C., and extremely hot, +85° C., the second plurality of orifices open as the pressure within the inflator increases to direct gas into the air bag. This relieves the inflator pressure and maintains the pressure at the level for proper inflation of the air bag without subjecting it to excessive deployment forces because of increasing ambient temperature. If the ambient temperature becomes very high, exceeding 85° C., the third plurality of orifices open to direct gas therethrough and away from the air bag for dissipation into the environment. The air bag, therefore, is not subjected to excessive deployment forces because of the extremely high ambient temperature.

In order to increase the amount of orifices working at the high temperature of +85° C., the cross section of the orifices of the third plurality of orifices, according to the invention, is made larger than that for the third plurality of orifices shown in FIGS. 1 and 2, representing the prior art. For accommodating orifices of such larger area an increased foil thickness may be provided for blocking off the orifices of the third plurality of orifices.

With this arrangement, it will be noted that the improved inflator of the invention is thrust neutral during all phases of its operation, specifically when the orifices of largest cross section are open, when the orifices of largest and smallest area are also open, and also when the orifices of largest, smallest and intermediate areas are all open at the same time. Thrust neutral performance is achieved with the orifices of the third plurality of orifices of intermediate size since those orifices extend all around the periphery of the inflator in uniformly spaced relation.

The invention is further characterized in that it lends itself to use with an air bag in a wrap-around configuration, as described hereinafter.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification in which like parts are designated by the same reference numbers, and of which.

DESCRIPTION OF THE PREFERRED EMBODIMENT

Figure 1:
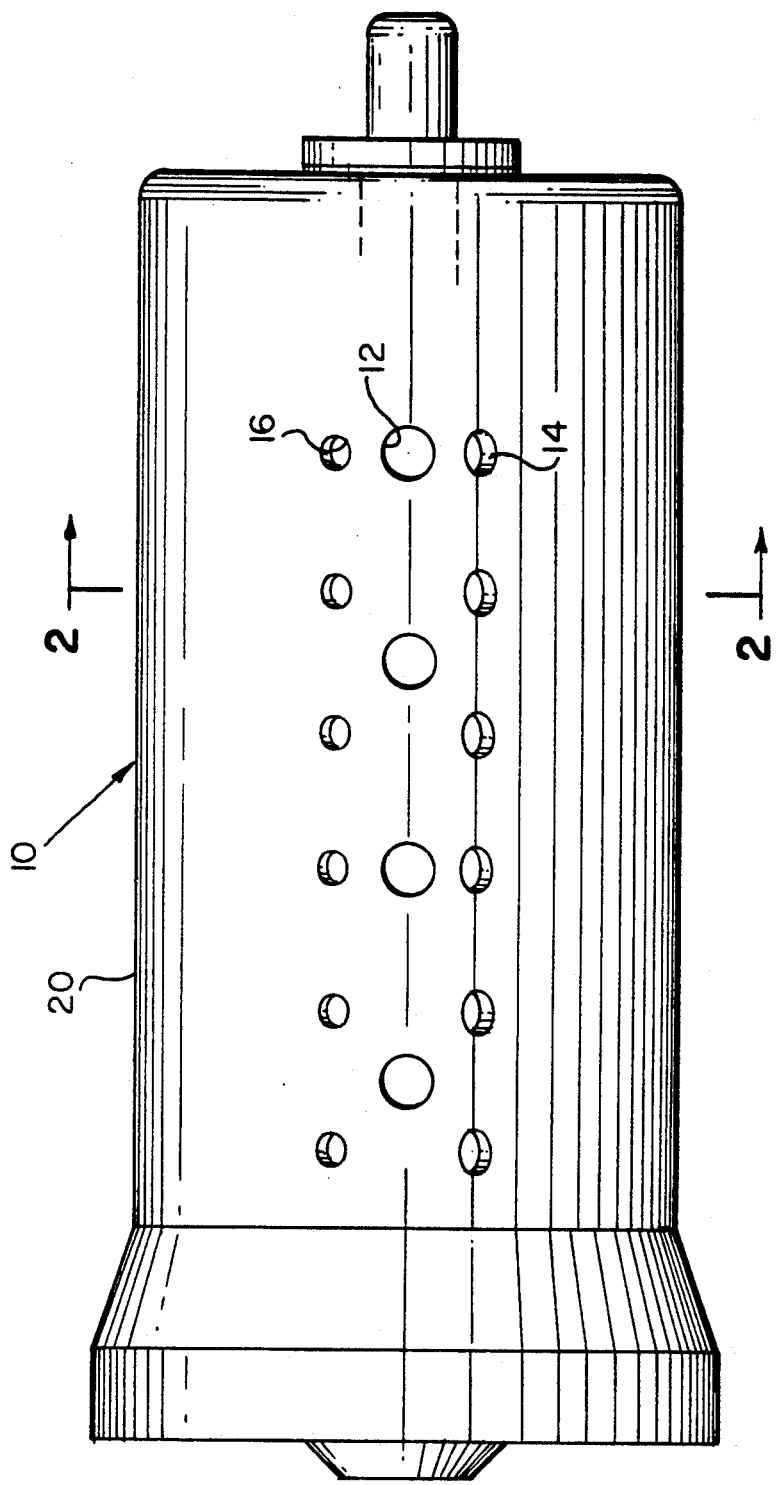
FIG. 1 is a longitudinal external view of an inflator assembly known in the prior art and described hereinbefore.
Figure 2:
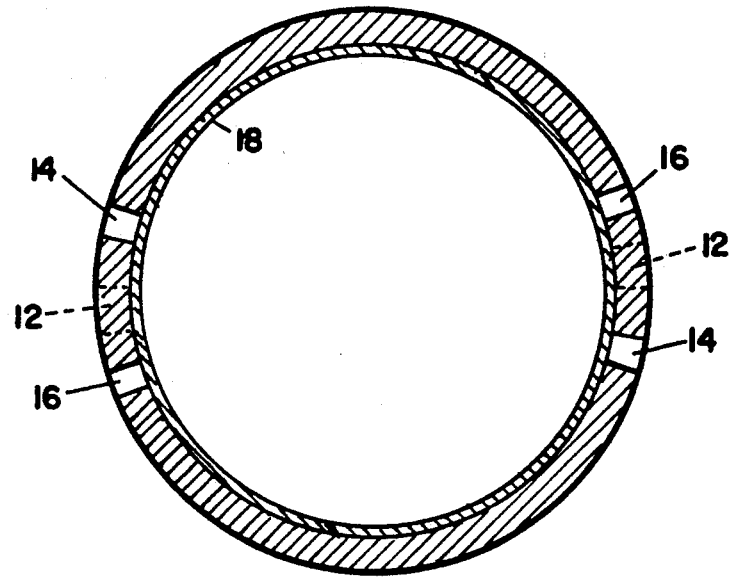
FIG. 2 is a fragmentary sectional view taken along the lines 2—2 of FIG. 1, illustrating the relationship of a housing of the inflator assembly to a sheet of rupturable foil which functions as a pressure control for the flow of generated gas from the inflator assembly.
Figure 4:
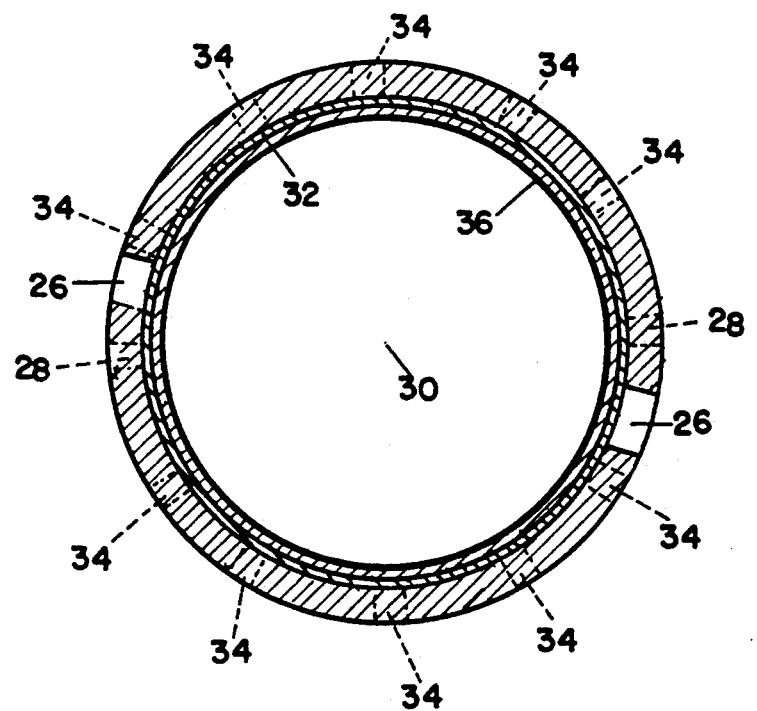
FIG. 4 is a fragmentary sectional view taken along the lines 4—4 of FIG. 1 illustrating the relationship of a housing for the inflator assembly to one or more sheets of rupturable foil which function as a pressure control for the flow of generated gas from the inflator assembly.
Figure 3:
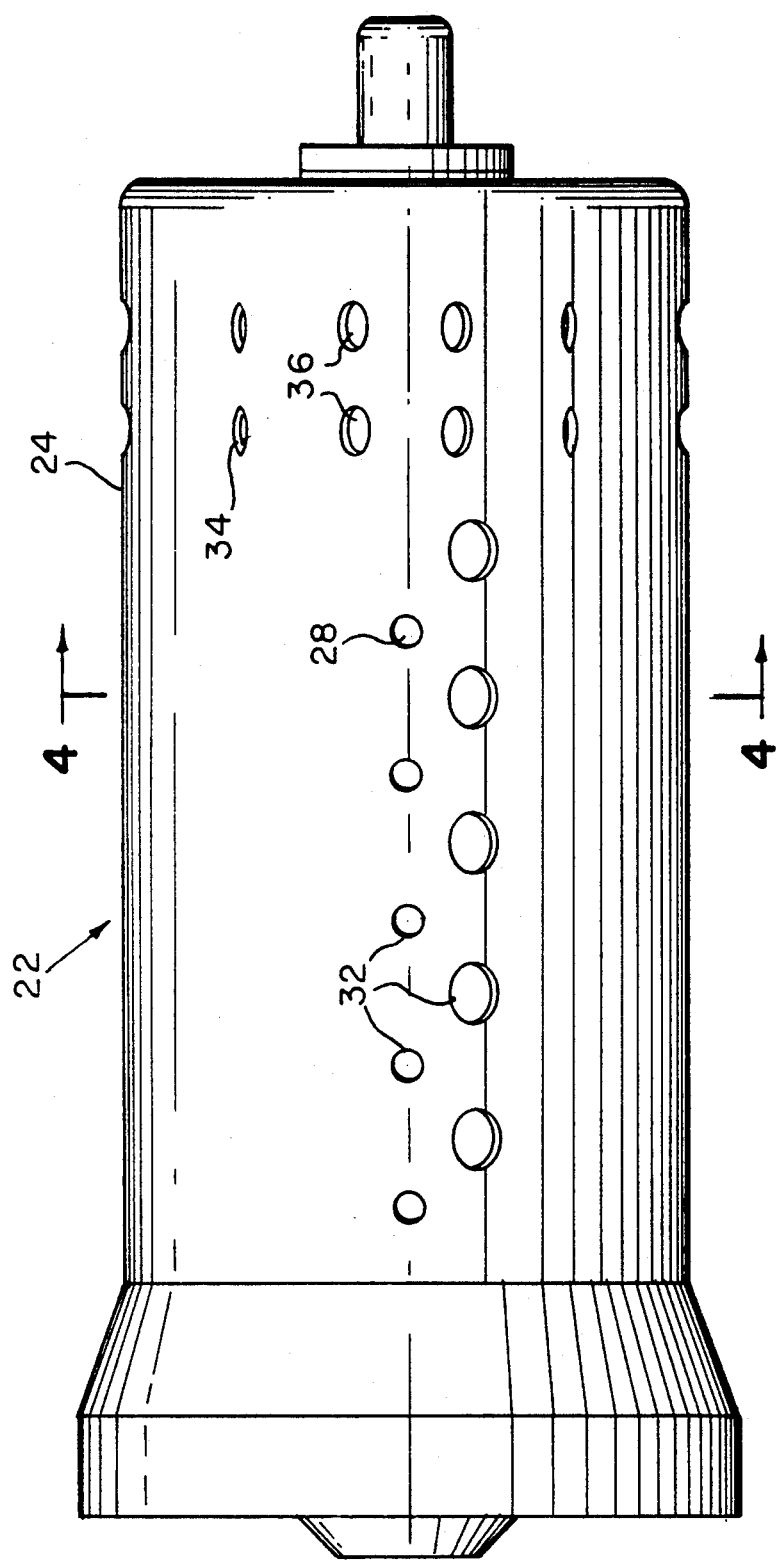
FIG. 3 is a longitudinal external view of an inflator assembly embodying the invention.

The embodiment of the invention illustrated in FIGS. 3 and 4 includes a solid fuel inflator 22 the internal construction of which may be generally similar to that of the aforementioned Davis et al. patent. Provided on opposed wall portions of the housing 24 of the inflator displaced substantially 180° from each other are first and second pluralities or rows of orifices 26 and 28, with each of the first and second pluralities of orifices positioned in a plane individual thereto, which planes are disposed at an angle to one another and intersect coincidently with the longitudinal axis 30 of the inflator 22. The orifices 26 of the first plurality of orifices have a larger area than the orifices 28 of the second plurality of orifices. The orifices of the first and second pluralities of orifices are spaced generally uniformly along a first portion of the length of the inflator 22 with the orifices 26 and 28 of the first and second pluralities of orifices being offset from one another. A layer of rupturable foil 32 on the inner wall of the housing for the inflator normally blocks all of the orifices of the first and second pluralities of orifices 26 and 28.

Additionally, in the illustrated invention embodiment, orifices 34 of a third plurality of orifices are provided in two rows in a second portion of the inflator 22, such second inflator portion being located adjacent and parallel to an end of the inflator 22. The orifices 34 of the third plurality of orifices are all of the same size, having an area that is intermediate in size the orifices 26 and 28 of said first and second pluralities of orifices, and extend completely around the periphery of the inflator 22 in uniformly side-by-side spaced relation. A layer of rupturable foil 36 of thickness greater than that of the layer of foil 32 is provided on the inner wall of housing 24 adjacent the orifices 34.

Prior to activation of the inflator 22, all three pluralities of first, second and third orifices are blocked. When the inflator 22 is activated by means not shown, as by the onset of a collision, the orifices 26 of the first plurality of orifices are unblocked or opened, when a sufficient pressure builds up in the inflator to rupture the rupturable foil 32 to direct a flow of inflating gas rearwardly into an air bag (not shown) for the proper inflation thereof, even in extremely cold weather, with the ambient temperature in the region of −30° C. When the ambient temperature is in a range intermediate such extreme cold and extremely hot, +85° C., the orifices 28 of the second plurality of orifices open as the pressure within the inflator 22 increases and ruptures the rupturable foil 32 to direct gas rearwardly into the air bag (not shown). If the ambient temperature becomes very high, reaching and exceeding 85° C., the orifices 34 of the third plurality of orifices open as the pressure in the inflator 22 increases and ruptures the rupturable foil 36 to direct gas forwardly away from the air bag (not shown) and into the surrounding environment, that is, either into the compartment of the automotive vehicle or into a duct for transmission externally thereof.

The use of rupturable foil 36 of increased thickness allows the use of larger orifices 34 than the orifices 16 in the inflator assembly 10 of the prior art described hereinbefore. The use of larger orifices 34 increases the amount of orifices working at +85° C.

Figure 5:
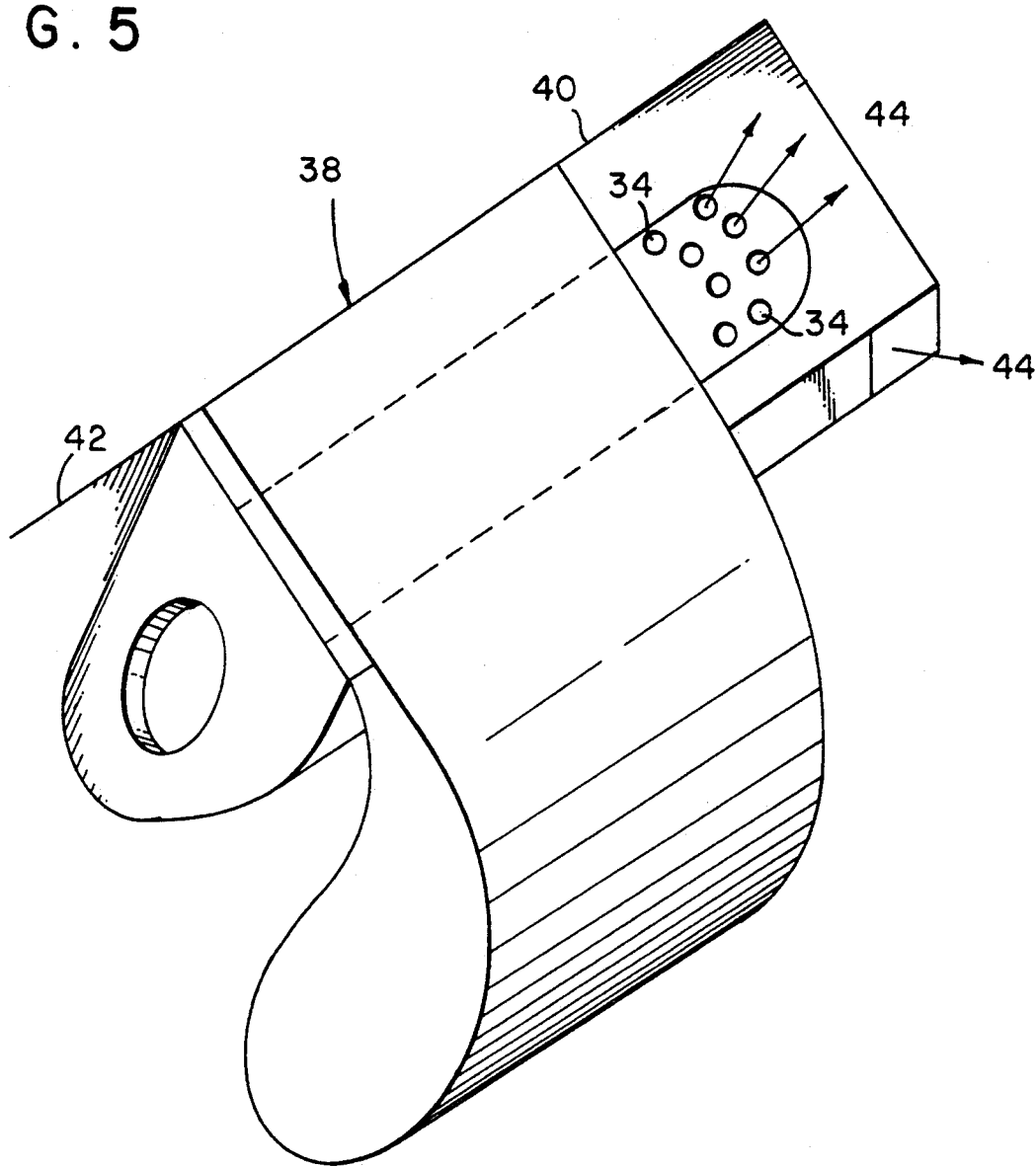
FIG. 5 is a perspective view illustrating an occupant restraint system including a reaction can with the inflator assembly of FIGS. 3 and 4 mounted therein and showing an air bag attached thereto in a wrap-around configuration prior to being folded and stored therein.
Figure 6:
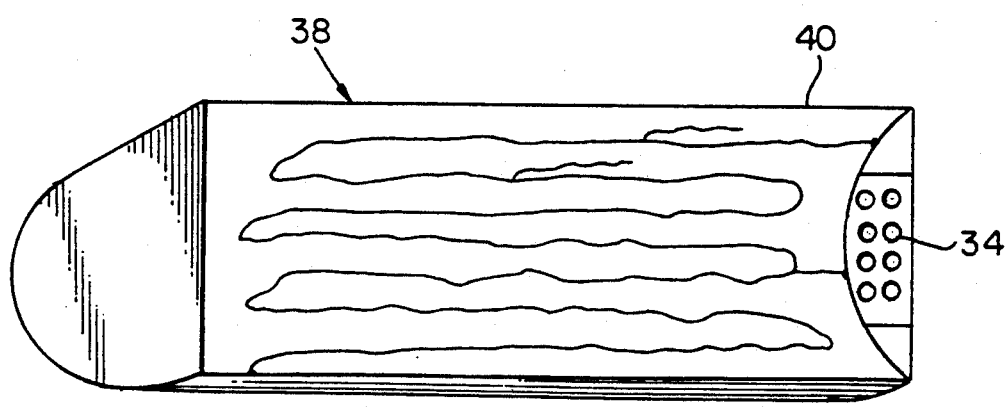
FIG. 6 is a front view of an occupant restraint system of FIG. 5 showing the air bag folded and stored therein.

An occupant inflatable restraint system 38 constructed in accordance with the present invention is illustrated in FIGS. 5 and 6 in an inactive condition, being mounted on the dashboard of an automotive vehicle. The restraint system includes a rigid metal reaction canister 40 which is fixed in any suitable manner to the dashboard 42 of the vehicle. The inflator assembly 22 is mounted within the reaction canister 40 in an orientation so that a flow of generated gas, initiated responsively to the onset of a collision by means not shown flows into the air bag and causes it to expand rearwardly into the passenger compartment. At high ambient temperatures, +85° C., while the air bag is still expanding, gas from the inflator assembly also flows through the rows of orifices 34 at the end of the inflator assembly 22 directly into the passenger compartment of the vehicle, as indicated by the arrows 44 in FIG. 6.

Thus, in accordance with the invention, there has been provided an improved inflator assembly used on the passenger side of automotive vehicles that is operative to provide leveled performance, that is equivalent occupant restraint, over the ambient temperature range from an extremely cold temperature of −30° C. to an extremely hot temperature of +85° C.

There has also been provided such an improved inflator assembly while maintaining a thrust neutral configuration.

Additionally, there has been provided such an improved inflator assembly that allows a wrap-around configuration.

With this description of the invention in detail, those skilled in the art will appreciate that modifications may be made to the invention without departing from the spirit thereof. Therefore, it is not intended that the scope of the present invention be limited to the specific embodiments illustrated and described. Rather, it is intended that the scope of the invention be determined by the scope of the appended claims.

What is claimed is:

1. An inflator for generating gas for inflating a vehicle occupant restrain, said inflator comprising,
    an elongated housing, said housing having a first plurality of orifices and a second plurality of orifices for directing gas generated by said inflator into the restraint and a third plurality of orifices for directing gas directed by said inflator away from the restraint,
    wherein said housing has a longitudinal axis,
    wherein said first plurality of orifices and said second plurality of orifices are distributed on opposite sides of said housing along a first portion along the length thereof with the orifices of each of said first plurality of orifices and of said second plurality of orifices being positioned in a plane individual thereto that passes through the longitudinal axis of said housing, and
    wherein said third plurality of orifices are uniformly distributed in at least one row around the periphery of a second portion of said housing adjacent an end thereof,
    means covering said first plurality of orifices, said second plurality of orifices, and said third plurality of orifices which ruptures at a first predetermined pressure to allow gas to flow into the restrain through said first plurality of orifices, which ruptures at a second predetermined pressure higher than said first predetermined pressure to allow gas to flow into the restraint through said second plurality of orifices, and which ruptures at a third predetermined pressure higher than said first and second predetermined pressures to allow gas to flow away from the restrain through said third plurality of orifices,
    with the orifices of the first, second and third plurality of orifices being so positioned with respect to said housing as to provide a thrust neutral configuration.

2. An inflator as defined by claim 1 wherein the orifices of each of said first plurality of orifices and of said second plurality of orifices are uniformly distributed along the length of said housing with the orifices of said first plurality of orifices being offset from said second plurality of orifices, and
    wherein the orifices of said third plurality of orifices are positioned in one or more parallel planes that are substantially perpendicular to said longitudinal axis of said housing.

3. An inflator assembly for air bag passenger restraint systems comprising,
    an elongated housing, said housing having a generally cylindrical wall, and a longitudinal axis,
    said wall having first and second pluralities of gas discharge orifices formed on opposite sides thereof with each of said first and said second plurality of orifices positioned in spaced relation in a plane individual thereto, which planes are disposed at an angle to one another and intersect coincidently with the longitudinal axis of said housing, said orifices of said first plurality of orifices having a larger area than the orifices of the second plurality of orifices, said orifices of said first and said second plurality of orifices being spaced generally uniformly along a first portion of the length of said elongated housing with the orifices of said first and said second pluralities of orifices being offset from one another,
    first rupturable foil means on the inner side of the wall of said housing blocking all of said first and second pluralities of orifices, and
    said wall further having a third plurality of gas discharge orifices provided in two rows in a second portion of the wall of said housing located adjacent and parallel to an end thereof, the orifices of said third plurality of orifices being all of the same size, with each such orifice having an area that is intermediate in size the areas of the orifices of said first and second pluralities of orifices, and extending in a plurality of rows completely around the periphery of said housing, and
    second rupturable foil means on the inner side of the wall of said housing blocking the orifices of said third plurality of orifices.

* * * * *

UNITED STATES PATENT AND TRADEMARK OFFICE
CERTIFICATE OF CORRECTION

PATENT NO. : 5,269,561
DATED : December 14, 1993
INVENTOR(S) : Davis et al.

It is certified that error appears in the above-identified patent and that said Letters Patent is hereby corrected as shown below:

At column 8, line 8, "restrain" should be -- restraint --.

At column 8, line 16, "restrain" should be -- restraint --.

Signed and Sealed this

Sixth Day of September, 1994

Attest:

BRUCE LEHMAN

*Attesting Officer*    *Commissioner of Patents and Trademarks*